(12) United States Patent
Roberson

(10) Patent No.: US 7,924,706 B1
(45) Date of Patent: Apr. 12, 2011

(54) METHOD AND APPARATUS FOR CONTROLLING THE OPERATION OF A FLEXIBLE CROSS-CONNECT SYSTEM

(75) Inventor: Charles S. Roberson, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 49 days.

(21) Appl. No.: 12/399,742

(22) Filed: Mar. 6, 2009

Related U.S. Application Data

(63) Continuation of application No. 09/533,421, filed on Mar. 22, 2000, now abandoned.

(60) Provisional application No. 60/125,526, filed on Mar. 22, 1999.

(51) Int. Cl.
*H04L 1/22* (2006.01)
*H04L 12/56* (2006.01)

(52) U.S. Cl. ........ 370/218; 370/354; 370/360; 370/386; 379/306

(58) Field of Classification Search .......... 370/216–250, 370/395.51, 350–357, 359, 360–363, 366–376, 370/378, 381, 386–388, 404, 419–420, 434, 370/463, 465, 535; 379/9–9.06, 10.01–10.03, 379/14–14.01, 32.01–32.03, 268, 269, 272, 379/306

See application file for complete search history.

(56) References Cited

U.S. PATENT DOCUMENTS

| | | | |
|---|---|---|---|
| 4,376,998 A | 3/1983 | Abbott et al. | |
| 4,756,019 A * | 7/1988 | Szybicki | 379/114.08 |
| 4,888,586 A | 12/1989 | Ise et al. | |
| 4,967,405 A | 10/1990 | Upp et al. | |
| 4,998,242 A | 3/1991 | Upp | |
| 5,040,170 A | 8/1991 | Upp et al. | |
| 5,161,152 A | 11/1992 | Czerwiec et al. | |
| 5,185,736 A | 2/1993 | Tyrrell et al. | |
| 5,189,410 A | 2/1993 | Kosugi et al. | |
| 5,315,594 A | 5/1994 | Noser | |
| 5,329,520 A | 7/1994 | Richardson | |
| 5,343,194 A | 8/1994 | Bowdon | |
| 5,436,890 A | 7/1995 | Read et al. | |
| 5,497,363 A | 3/1996 | Gingell | |
| 5,737,320 A | 4/1998 | Madonna | |
| 5,740,157 A | 4/1998 | Demiray et al. | |
| 5,771,274 A | 6/1998 | Harris | |
| 5,781,527 A | 7/1998 | Read et al. | |
| 5,790,519 A | 8/1998 | Hanson et al. | |
| 5,841,760 A | 11/1998 | Martin et al. | |
| 5,848,065 A | 12/1998 | Gorshe et al. | |
| 5,872,780 A | 2/1999 | Demiray et al. | |
| 5,901,136 A | 5/1999 | Lovelace et al. | |
| 6,038,212 A | 3/2000 | Galand et al. | |

(Continued)

OTHER PUBLICATIONS

Henry J. Fowler, "TMN-Based Broadband ATM Network," IEEE Communication Magazine, Mar. 1995.

(Continued)

*Primary Examiner* — Aung S Moe
*Assistant Examiner* — Habte Mered

(57) ABSTRACT

The present invention discloses a method and apparatus for cross-connecting high-speed telecommunications signals at a flexible cross-connect system. A method and apparatus for controlling communications between each of the cards located within the flexible cross-connect system is also disclosed. The method and apparatus also detect and report failures within the system, receive and validate software upgrades from external sources, maintain synchronization within the system, and monitor communication maps for the system.

19 Claims, 8 Drawing Sheets

U.S. PATENT DOCUMENTS

| | | |
|---|---|---|
| 6,038,288 A | 3/2000 | Thomas et al. |
| 6,092,214 A | 7/2000 | Quoc et al. |
| 6,122,639 A | 9/2000 | Babu et al. |
| 6,160,806 A | 12/2000 | Cantwell et al. |
| 6,188,686 B1 | 2/2001 | Smith |
| 6,359,859 B1 | 3/2002 | Brolin et al. |
| 6,363,421 B2 | 3/2002 | Barker et al. |
| 6,370,155 B1 | 4/2002 | Cantwell et al. |
| 6,385,194 B2 | 5/2002 | Surprenant et al. |
| 6,392,989 B1 | 5/2002 | Jardetzky et al. |
| 6,414,953 B1 | 7/2002 | Lamarche et al. |
| 6,424,629 B1 | 7/2002 | Rubino et al. |
| 6,424,649 B1 | 7/2002 | Laor et al. |
| 6,580,720 B1 | 6/2003 | Francis et al. |
| 6,587,470 B1 | 7/2003 | Elliot et al. |
| 2003/0133417 A1 | 7/2003 | Badt, Jr. |

OTHER PUBLICATIONS

Technical Note, The Fundamentals of SONET, Telecommunications Techniques Corporation, pp. 1-28, Nov. 1994.

Ching et al., SONET Implementation, IEEE, pp. 34-40, Sep. 1993.

DeWilde et al., Integrated Switch and Cross-Connect Systems as a Flexible Transport Network, IEEE, pp. 675-678, Mar. 1988.

Jun et al., "Stand-By Loading Scheme: An Efficient Software Retrofit Method for Switching System," IEEE, Presented at Computer Communications 1998 Proceedings, Jun. 30, 1998.

\* cited by examiner

METHOD AND APPARATUS FOR CONTROLLING THE OPERATION OF A FLEXIBLE CROSS-CONNECT SYSTEM

This application is a continuation of U.S. patent application Ser. No. 09/533,421, filed on Mar. 22, 2000, now abandoned which in turn claims priority to U.S. Provisional Application No. 60/125,526, filed on Mar. 22, 1999. This application is also related to U.S. patent application Ser. No. 09/274,078 which was also filed on Mar. 22, 1999 (the same day as the provisional application). Application Ser. Nos. 60/125,526 and 09/274,078 are herein incorporated by reference but are not admitted to be prior art.

BACKGROUND OF THE INVENTION

Telecommunications (telecom) systems are carrying increasing amounts of information, both in long distance networks as well as in metropolitan and local area networks. At present, data traffic is growing much faster than voice traffic, and includes high bandwidth video signals. In addition to the requirement for equipment to carry increasing amounts of telecom traffic there is a need to bring this information from the long distance networks to businesses and to locations where it can be distributed to residences over access networks.

The equipment which has been developed to carry large amounts of telecom traffic includes fiber optic transport equipment which can carry high speed telecom traffic. The data rates on fiber optic systems can range from millions of bits per second (Mb/s) to billions of bits per second (Gb/s). In addition, multiple wavelengths of light can be carried on an optical fiber using Wavelength Division Multiplexing (WDM) techniques.

The ability to carry large amounts of telecom traffic on an optical fiber solves the long-distance point-to-point transport problem, but does not address the issue of how to add and remove traffic from the high-speed data stream. Equipment for adding and removing traffic has been developed and is referred to as "add-drop" multiplexers (ADMs).

Traditional designs for ADMs are based on the use of multiple interface cards which receive high-speed data streams, create a time division multiplex signal containing the multiple data streams, and route the time division multiplex signal to a cross-connect unit which can disassemble the data streams, remove or insert particular data streams, and send the signal to another interface card for transmission back into the networks. By aggregating the multiple data streams into a time division multiplexed data signal, the data rate of the time division multiplexed signal is by definition several times the rate of the maximum data rate supported by the interface cards. Traditional ADMs have proven adequate for interface data rates in the range of 155 Mb/s to 622 Mb/s.

However, optical signals of at least 2.4 Gb/s have become standard, and traditional ADMs do not work for these high-speed optical signals. That is, numerous problems arise due to the timing associated with the multiplexing and transmission of the high-speed signals between the interface cards and the cross-connect unit. Thus, there is a need for cross-connect equipment which can support multiple high speed data streams (i.e., at least 2.4 Gb/s).

Standardized interfaces and transmission hierarchies for telecom signals have been developed and include Pleisochronous Digital Hierarchy (PDH), Synchronous Digital Hierarchy (SDH) standards, and Synchronous Optical Network (SONET). In addition to these telecom transport standards, standards have been developed for interconnecting businesses and computers within businesses. These Metropolitan and Local Area Network (MAN/LAN) standards include Ethernet, Gigabit Ethernet, Frame Relay, and Fiber Distributed Data Interface (FDDI). Other standards, such as Integrated Services Digital Network (ISDN) and Asynchronous Transfer Mode (ATM) have been developed for use at both levels.

Individual pieces of equipment can be purchased to support telecom or MAN/LAN standards. However, these devices generally either connect data streams using a signal protocol or convert entire data streams from one protocol to another. Thus, there is a need for a device which can establish interconnectivity between interfaces at the MAN/LAN level, while providing cross-connection to interfaces at the telecom network level.

Multiple interfaces are presently supported in cross-connect equipment using different interface cards. High-speed interface cards must be inserted into particular slots in order to insure that the high-speed signals can be transported to and from the cross-connect unit and to and from the high-speed interface cards. It would be desirable to have a cross-connect system in which all cards can support high-speed optical signals of at least 2.4 Gb/s, regardless of the card slot they are located in. Moreover, it would also be useful to have a system which would support routing, bridging, and concentration functions within MANs/LANs, as well as permitting access to telecom networks.

For the foregoing reasons, there is a need for a flexible cross-connect apparatus that includes a data plane and can support multiple high-speed optical interfaces in any card slot. Furthermore, the flexible cross-connect apparatus can establish connectivity between data cards and the telecom networks.

SUMMARY OF THE INVENTION

The present invention discloses a method and apparatus for cross-connecting high-speed telecommunications signals at a flexible cross-connect system. A method and apparatus for controlling communications between each of the cards located within the flexible cross-connect system is also disclosed. The method and apparatus also detect and report failures within the system, receive and validate software upgrades from external sources, maintain synchronization within the system, and monitor communication maps for the system.

According to one embodiment, a method for controlling the operation of a flexible cross-connect system that includes a control unit, a plurality of interface cards, a cross-connect unit and a backplane is disclosed. The method includes managing provisioning data for the entire flexible cross-connect system, managing the communications between the control unit and all subordinate cards (plurality of interface cards and the cross-connect unit), and maintaining synchronization within the flexible cross-connect system.

According to one embodiment, a computer program embodied on a computer readable medium for controlling the operation of a flexible cross-connect system is disclosed. The computer program includes a code segment for providing internal interfaces between all code segments of the computer program, a code segment for managing provisioning data for the entire flexible cross-connect system, a code segment for managing the communications between the control unit and all subordinate cards, and a code segment for maintaining synchronization within the flexible cross-connect system.

According to one embodiment, a method for downloading or upgrading software for a flexible cross-connect system is disclosed. The method includes establishing communications between the flexible cross-connect system and an external management system, receiving the software download from the external management system, verifying the integrity of the software download, and storing the software download.

According to one embodiment, a computer program for downloading or upgrading software for a flexible cross-connect system is disclosed. The computer program includes a code segment for establishing communications between the flexible cross-connect system and an external management system; a code segment for receiving the software download from the external management system; a code segment for verifying the integrity of the software download; and a code segment for storing the software download.

According to one embodiment, a method for maintaining a connection map for a flexible cross-connect system, wherein the flexible cross-connect system is a single node in at least one network and the connection map tracks a configuration for the at least one network is disclosed. The method includes storing a listing of all nodes of each network that the flexible cross-connect system is a part of; detecting when a change (i.e., switching to or from a protection channel) in status for the flexible cross-connect system occurs; reporting the change to all of the nodes of each of the networks that the flexible cross-connect system is a part of; and updating the connection map to indicate the change in status of the flexible cross-connect system.

According to one embodiment, a computer program for maintaining a connection map for a flexible cross-connect system is disclosed. The computer program includes a code segment for storing a listing of all nodes of each network that the flexible cross-connect system is a part of; a code segment for detecting when a change in status for the flexible cross-connect system occurs; a code segment for reporting the change to all of the nodes of each of the networks that the flexible cross-connect system is a part of; and a code segment for updating the connection map to indicate the change in status of the flexible cross-connect system.

According to one embodiment, a method for monitoring and maintaining the status of, and controlling the communications to, each subordinate card within a flexible cross-connect system is disclosed. The method includes monitoring an operational state for each subordinate card and each communications link within the flexible cross-connect system; determining when the operational state for any of the subordinate cards or the communications links indicates that maintenance is required; and reporting that maintenance is required for the determined subordinate card or the determined communications link.

According to one embodiment, a computer program for monitoring and maintaining the status of, and controlling the communications to, each subordinate card within a flexible cross-connect system is disclosed. The computer program includes a code segment for monitoring an operational state for each subordinate card and each communications link within the flexible cross-connect system; a code segment for determining when the operational state for any of the subordinate cards or the communications links indicates that maintenance is required; and a code segment for reporting that maintenance is required for the determined subordinate card or the determined communications link.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description tion serve to explain the principles of the invention.

In the drawings.

DETAILED DESCRIPTION OF THE PREFERRED EMBODIMENTS

Figure 1:
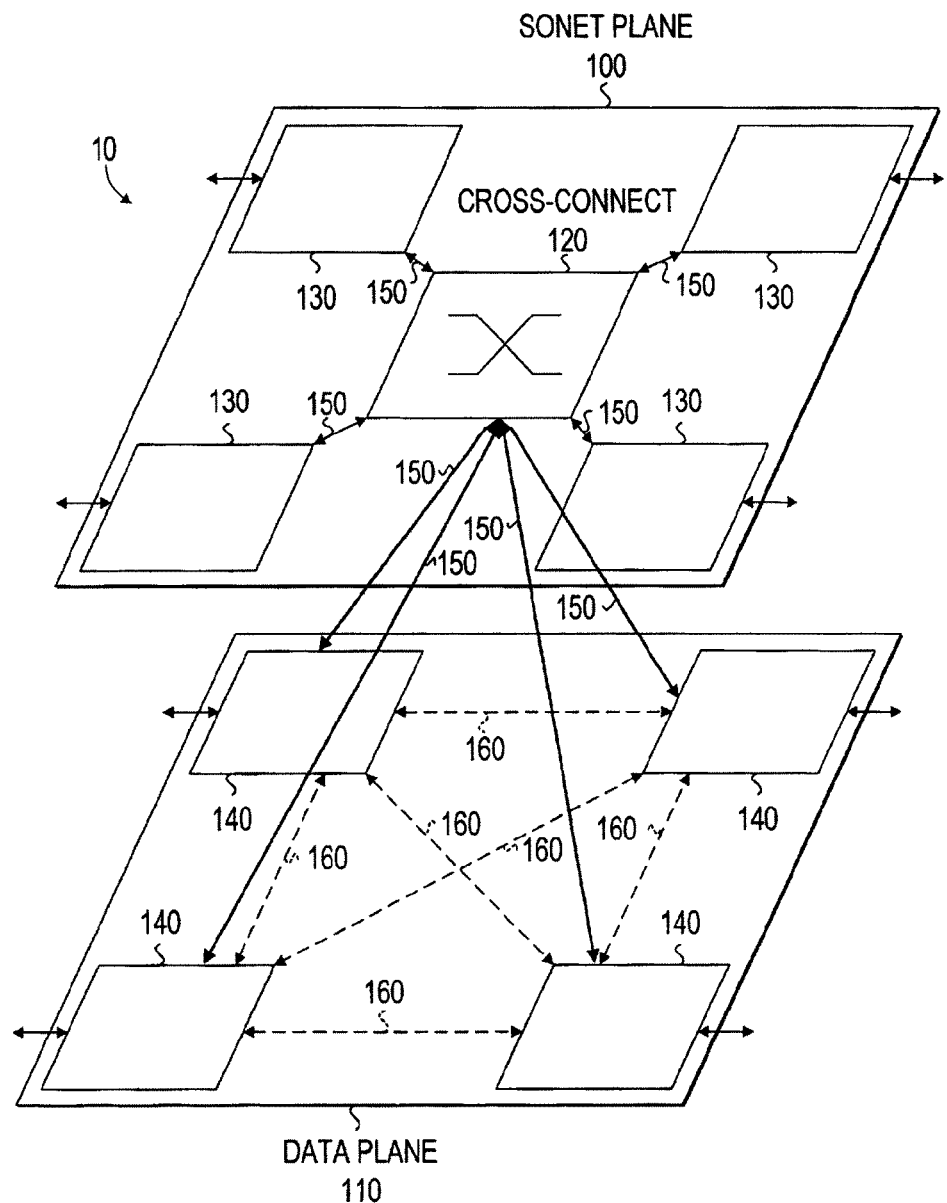
FIG. 1 illustrates a block diagram of the flexible cross-connect system, according to one embodiment.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 8 in particular, the apparatus and method of the present invention are disclosed.

The present invention supports numerous telecommunications (telecom) and networking standards, including the following which are incorporated herein by reference:

Bellcore Standard GR-253 CORE, Synchronous Optical Network (SONET) Transport Systems: Common Generic Criteria, Issue 2, December 1995;

Bellcore Standard GR-1230 CORE, SONET Bi-directional Line-Switched Ring Equipment Generic Criteria, Issue 3A, December 1996;

Bellcore Standard GR-1400 CORE, SONET Uni-directional Line-Switched Ring Equipment Generic Criteria;

Bellcore TR-NWT-000496, SONET Add-Drop Multiplex Equipment (SONET ADM) Generic Criteria, Issue 3, May 1992;

Bellcore Transport System Generic Requirements FR-440, Issue No. 98, September 1998; IEEE/ANSI 802.3 Ethernet LAN specification; and Networking Standards, by William Stallings, published by Addison-Wesley Publishing Company (New York, 1993).

FIG. 1 illustrates a block diagram of a flexible cross-connect system 10 capable of routing traffic across two high-bandwidth planes. The flexible cross-connect system 10 includes a telecom plane 100, such as a SONET plane, and a data plane 110. The telecom plane 100 includes telecom plane network interface subsystems 130, and the data plane 110 includes data plane network interface subsystems 140. A centralized fully non-blocking cross-connect unit (XC) 120 is located in the telecom plane 100, which interfaces with the telecom plane network interface subsystems 130 and the data plane network interface subsystems 140.

Standardized telecom traffic, such as SONET, Synchronous Digital Hierarchy (SDH) and Pleisochronous Digital Hierarchy (PDH), enters the system through the telecom plane network interface subsystems 130, such as electrical or optical interface subsystems. The telecom traffic is transmitted from the telecom plane network interface subsystems 130 over point-to-point connections 150 to the XC 120. The XC 120 processes the telecom traffic and then transmits the processed data back to a telecom network, such as a Wide Area Network (WAN), or transmits the processed data to a data network, such as a Metropolitan or Local Area Network (MAN/LAN). The processed data is transmitted to the telecom network via the telecom plane network subsystem(s) 130, and to the data network via the data plane network interface subsystem(s) 140.

Standardized telecom signals include, but are not limited to, DS-1 (1.5 Mb/s), B-ISDN (1.5 Mb/s) DS-2 (6.3 Mb/s), DS-3 (44.7 Mb/s), CEPT-1 (2.048 Mb/s), CEPT-2 (8.45 Mb/s), CEPT-3 (34.37 Mb/s), CEPT-4 (139.3 Mb/s), electrical STS-1 and its multiples, electrical STM-1 and its multiples, and optical OC-1 and its multiples. Other standardized and non-standardized transmission signal formats can be supported and are understood by those skilled in the art.

Standardized data traffic, such as Ethernet, enters the system through the data plane network interface subsystems 140, such as electrical or optical interface subsystems. The data plane network interface subsystems 140 communicate with the XC 120 via point-to point connections 150. The data plane 110 also allows for communications between data plane network interface subsystems 140 via point-to-point connectors 160. Thus, the data traffic can be processed by multiple data plane interface subsystems 140 before being transmitted to the XC 120 or back to the data network. As with the telecom traffic, the XC 120 processes the data traffic and transmits the processed data to a telecom network or a data network.

Standardized data signals include, but are not limited to, packet data transport formats such as Frame Relay, Asynchronous Transfer Mode (ATM), and Integrated Services Digital Network (ISDN); and MAN/LAN formats such as Ethernet, Fiber Distributed Data Interface (FDDI), and Token Ring. The interfaces supported by the data plane network interface subsystems 140 include electrical Ethernet interfaces such as 10 BaseT and 100 BaseT, as well as optical interfaces such as 1000 BaseT and Gigabit Ethernet. Other data-centric interfaces can be used and are understood by those skilled in the art.

In one embodiment, the point-to-point connections 150 between the XC 120 and the telecom plane network interface subsystems 130 or between the XC 120 and the data plane network interface subsystems 140 are all in a single specified format. For example, in a preferred embodiment, all the point-to-point connections 150 are high-speed connections realized as Synchronous Transfer Signal (STS)-192 formatted signals. The STS-192 signals are transported on a multi-trace electrical bus formed on a high-speed backplane.

Figure 2:
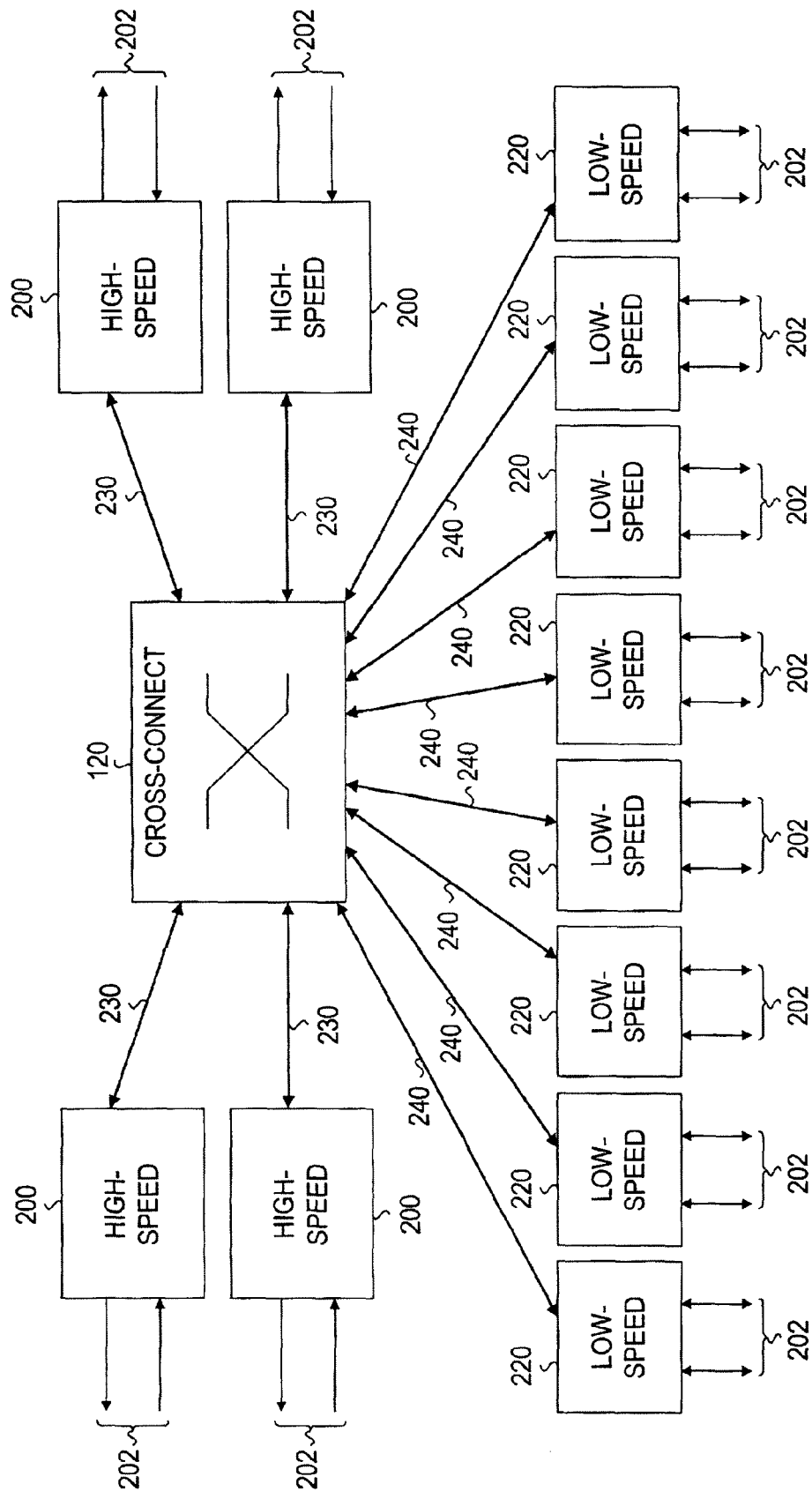
FIG. 2 illustrates a functional diagram of the flexible cross-connect system, according to one embodiment.

In an alternative embodiment, as illustrated in FIG. 2, specific network interface subsystems are designated as high-speed interface subsystems 200 and others are designated as low-speed interface subsystems 220 having corresponding high-speed connections 230 and low-speed connections 240 to the XC 120. For example, the low-speed interconnections 240 may operate at the STS-48 rate of 2.488 Gb/s, while the high-speed interconnections 230 may operate at the STS-192 rate of 9.953 Gb/s.

The high speed network interface subsystems 200 may be realized as printed circuit boards containing active and passive electrical and optical components, and may contain multiple network interfaces 202 operating at the same or different speeds. The low speed network interface subsystems 220 may also be realized as printed circuit boards with active and passive electrical and optical components, and can contain multiple network interfaces 202 operating at the same or different speeds. As an example, a low speed network interface subsystem 220 can be realized as a DS-1 interface board supporting 14 DS-1 interfaces. Alternatively, a low speed network interface subsystem 220 can be realized as an Ethernet board supporting multiple Ethernet interfaces.

Figure 3:
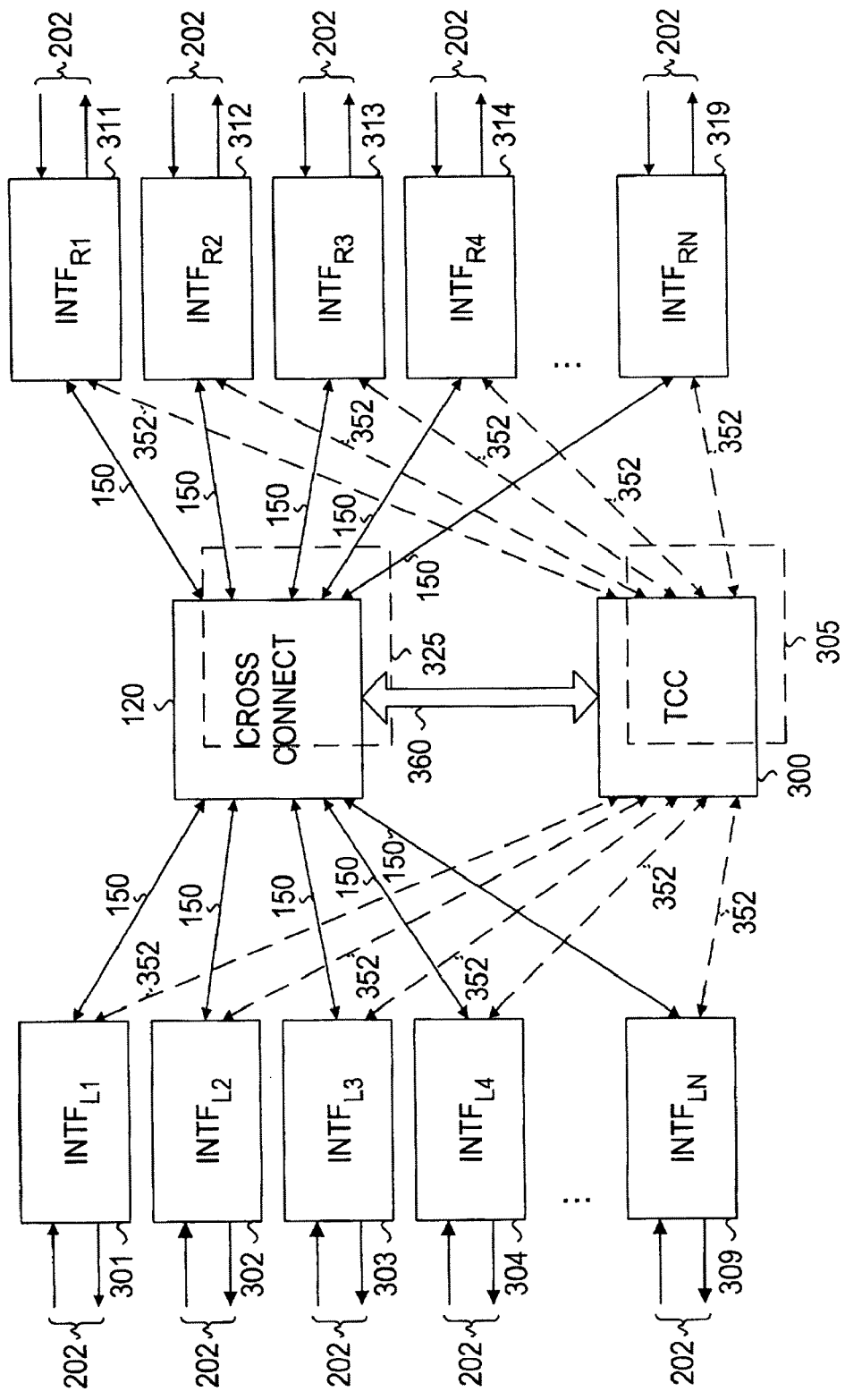
FIG. 3 illustrates communication channels between elements of the flexible cross-connect system, according to one embodiment.

As illustrated in FIG. 3, the XC 120 has direct point-to-point connections 150 with each interface subsystem 301, 302, 303, 304, 309, 311, 312, 313, 314, 319. Each of the interface subsystems 301-304, 309, 311-314, and 319 represent an interface card which is either of the class of cards which are telecom plane network interface subsystems 130 (high-speed) or which are data plane network interface subsystems 140 (low-speed). There are multiple point-to-point System Communication Links (SCLs) 352 between a centralized Timing, Control, and Communications subsystem (TCC) 300 and each of the interface subsystems 301-304, 309, 311-314, and 319. The TCC 300 is also directly connected to the XC 120 via a TCC to XC communication bus 360. In a preferred embodiment, the system has a redundant XC 325 and a redundant TCC 305.

The XC 120 provides the switching fabric for the system. As the central switching element for the system, the XC 120 features low latency and fast switching to establish connections and perform time division switching at an STS-1 level between the XC 120 and the telecom network interface subsystem 130 and between the XC 120 and the data plane network interface subsystem 140.

The TCC 300 performs system initialization, provisioning, alarm reporting, maintenance, diagnostics, Internet Protocol (IP) address detection/resolution, SONET Data Communications Channel (DCC) termination, and system fault detection for the system. The TCC 300 also ensures that the system maintains Bellcore timing requirements. These functions can be performed by a processor which executes a set of computer instructions stored on a computer readable memory.

Figure 4:
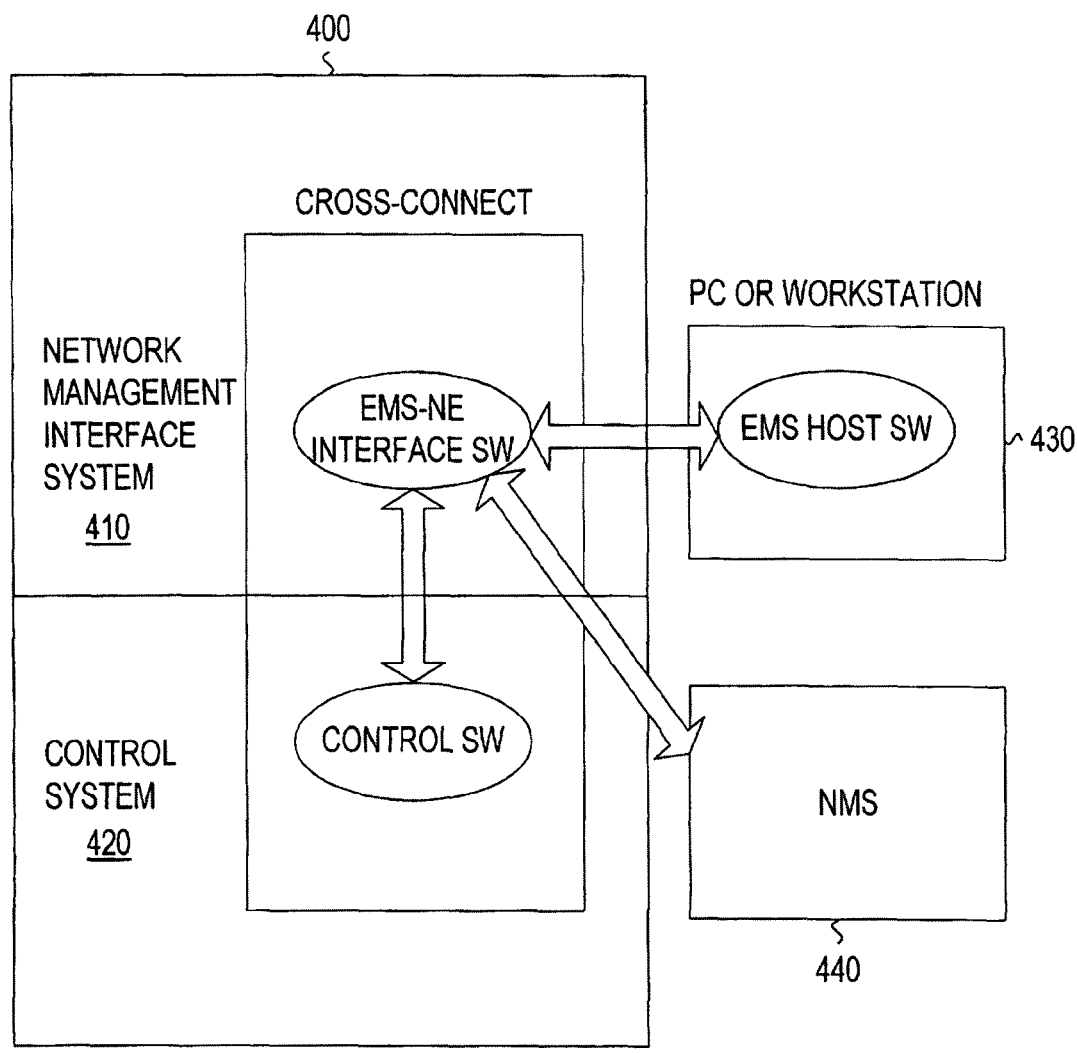
FIG. 4 illustrates a functional diagram of the software, according to one embodiment.

FIG. 4 illustrates a functional diagram of the software 400 of the flexible cross-connect system 10. The software 400 can be divided into two functional subsystems, a Network Management Interface System (NMIS) 410 and a Control System (CS) 420. The NMIS 410 provides the interface between and communicates with external machines, such as a PC or workstation. The external machine may either be an Element Management System (EMS) 430 or an off-node Network Management System (NMS) 440. A Java and C++ based Corba system is preferably utilized to provide a computing environment between the NMIS 410 and the EMS 430 or the NMS 440. The NMIS 410 also performs validation of all commands received from the EMS 430 or the NMS 440, and transmits the validated inputs to the CS 420. The NMIS 410 receives all information related to the status of the flexible cross-connect system 10 from the CS 420. In a preferred embodiment, the NMIS 410 can transmit the data to a Java application in a browser, the NMS 440 for presentation to a user, or to the OMS. In one embodiment, the NMIS 410 is written using an object oriented software language, and preferably is written using C++. In a preferred embodiment, the NMIS 410 is also written in Java, to the extent that the NMIS 410 can transmit Java commands to the EMS 430 or the NMS 440.

In a preferred embodiment, the EMS 430 and the NMS 440 will act as a Java Virtual Machine (JVM). That is, each of the devices communicating with the flexible cross-connect system 10 will be able to receive the Java commands transmitted from the NMIS 410 as if it were a Java processor. Stated alternatively, the EMS 430 and the NMS 440 act a web browser and receive Java commands from the NMIS 410 which is acting as a web server.

Figure 5:
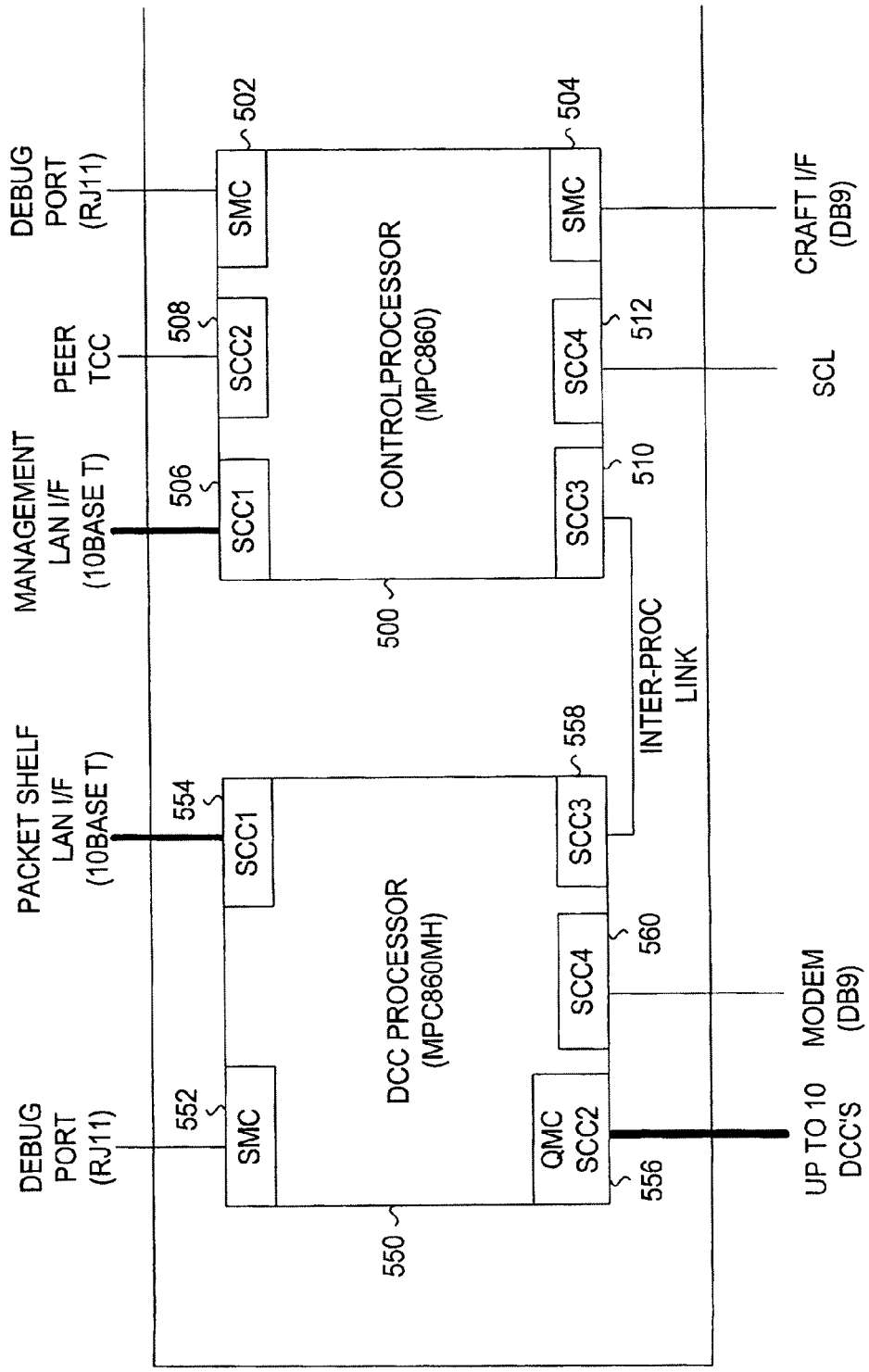
FIG. 5 illustrates the interfaces for the processors of the system, according to one embodiment.

In one embodiment, as illustrated in FIG. 5, the software 400 is hosted on two separate processors, with one processor being the master processor and the other processor being a slave. The master processor will handle communications with the EMS 430 or the NMS 440, and control the overall operation of the flexible cross-connect system 10. The master processor will thus be known as the Control Processor (CP) 500. In a preferred embodiment, the CP 500 is an MPC860 processor or the like. The slave processor will handle Data Communications Channels (DCCs) to other flexible cross-connect systems 10 and be used for the additional ports. The slave processor will thus be known as the DCC processor (DCCP) 550. In a preferred embodiment, the DCCP 550 is an MPC860 MH processor or the like.

FIG. 5 illustrates the interfaces of each of the processors (the CP 500 and the DCCP 550) running the software 400. In one embodiment, the CP 500 has two Serial Management Controllers (SMCs) 502, 504 and four Serial Communications Controllers (SCCs) 506, 508, 510, 512, and the DCCP 550 has one SMC 552 and four SCCs 554, 556, 558, 560.

Each processor, the CP 500 and the DCCP 550, will host remote monitoring software which tracks the status of the system so as to aid in the debugging process. Access to the status/debug information is made available external to the flexible cross-connect system 10 by using SMCs 502 and 552, operating as a Universal Asynchronous Receiver/Transmitter (UART), to provide the status/debug information over a port. In a preferred embodiment, the ports are 19.2 Kb/s serial RJ11 ports.

The CP 500 is capable of communicating with the EMS 430 or the NMS 440 over a LAN. The CP 500 interfaces with the LAN via an interface supported by the SCC 506. In a preferred embodiment, the interface is a 10 Mb/s Ethernet (IEEE 802.3) interface.

Each processor is capable of communicating with the other processor via an inter-processor link. The SCCs 510 and 558 support ports which provide the inter-processor link between the CP 500 and the DCCP 550. The link allows the processors to communicate provisioning, status and alarms between themselves. In a preferred embodiment, the link is a serial communications link and the ports support communications at 1-2 Mb/s.

The DCCP 550 is provided with an interface, supported by the SCC 560, for modem dial out in the event the LAN interface is unavailable. In a preferred embodiment, the interface is a 9 pin serial interface supporting communications at 19.2 Kb/s.

The DCCP 550 has a management interface that supports up to 10 Data Communications Channels (DCCs), of up to 192 Kb/s, to other flexible cross-connect systems 10. This management interface is supported by the SCC 556. In a preferred embodiment, this interface operates as a multi-channel protocol, such as QMC.

The CP 500 is provided with an interface, supported by the SMC 504, for supporting a TL-1 Bellcore standard interface. In a preferred embodiment, the interface is a 9 pin ASCII over serial interface supporting communications at 19.2 Kb/s.

The DCCP 550 is provided with an interface, supported by the SCC 554, for connecting the flexible cross-connect system 10 to any subtending shelves feeding the main shelf. In a preferred embodiment, the interface is a 10 Mb/s Ethernet (IEEE 802.3) interface.

The CP 500 is provided with an interface, supported by the SCC 512 for inter-card message communications. In a preferred embodiment, the interface is a 4 Mb/s SCL and the inter-card communications path utilizes the 64 byte cell-bus component of the SCL.

While the illustrated embodiment includes two processors with one acting as the master and one as the slave, it is well within the scope of the current invention to have all the software 400 on one processor.

Figure 6:
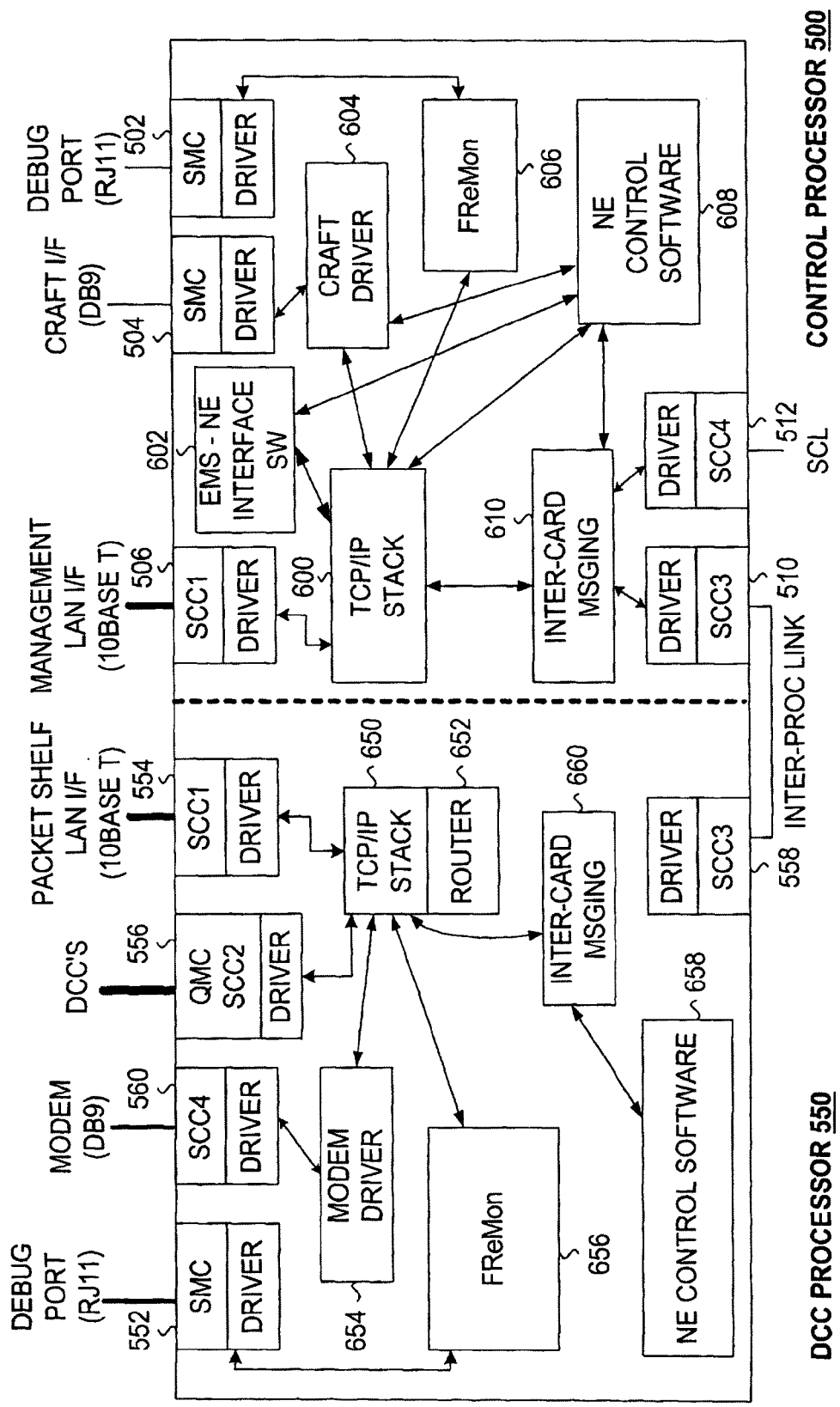
FIG. 6 illustrates the software supporting each of the interfaces of FIG. 5, according to one embodiment.

FIG. 6 illustrates the software supporting each of the interfaces described with respect to FIG. 5. In the embodiment illustrated, the CP 500 utilizes a Transmission Control Protocol (TCP)/IP stack 600 to communicate between the software modules on the CP 500 and the management LAN via the management LAN interface (SCC driver 506). As illustrated, a EMS-NE interface module 602, a craft driver 604, a remote monitoring module 606, a control software module 608, and an inter-card messaging module 610 communicate with each other utilizing the TCP/IP stack 600. The craft driver 604 supports the SMC driver 504 for the craft interface port, the remote monitoring module 606 supports the SMC driver 502 for the debug port, and the inter-card messaging module 610 supports the SCC driver 510 for the inter-card communications port and the SCC driver 512 for the SCL port.

The DCCP 550 includes a TCP/IP Stack 650 on top of a router 652 for communicating between the software modules on the DCCP 550, subtending shelves feeding the main shelf via the packet shelf LAN interface (SCC driver 554), and other flexible cross-connect systems 10 via the DCC port (SCC driver 556). As illustrated, a modem driver 654, a remote monitoring module 656, a control software module 658, and an inter-card messaging module 660 communicate with each other utilizing the TCP/IP stack 650. The modem driver 654 supports the SCC driver 560 for the modem interface port, the remote monitoring module 656 supports the SMC driver 552 for the debug port, and the inter-card messaging module 660 supports the SCC driver 558 for the inter-card interface port.

The interconnections described in FIGS. 5 and 6 allow the flexible cross-connect system 10 to be connected to multiple networks at one time. In a preferred embodiment, the flexible cross-connect system 10 allows for up to 10 DCC connections, 2 LAN connections and 1 modem connection. Thus, the flexible cross-connect system 10 could be part of 13 sub-networks at one time. In a preferred embodiment, a routing protocol, such as RIP or Open Shortest Path First (OSPF), is utilized which allows the connections to be unnumbered so that a single IP address can be used to identify the flexible cross-connect system 10 for each of the networks that it is connected to. The single IP address would be the address for the management LAN.

Figure 7:
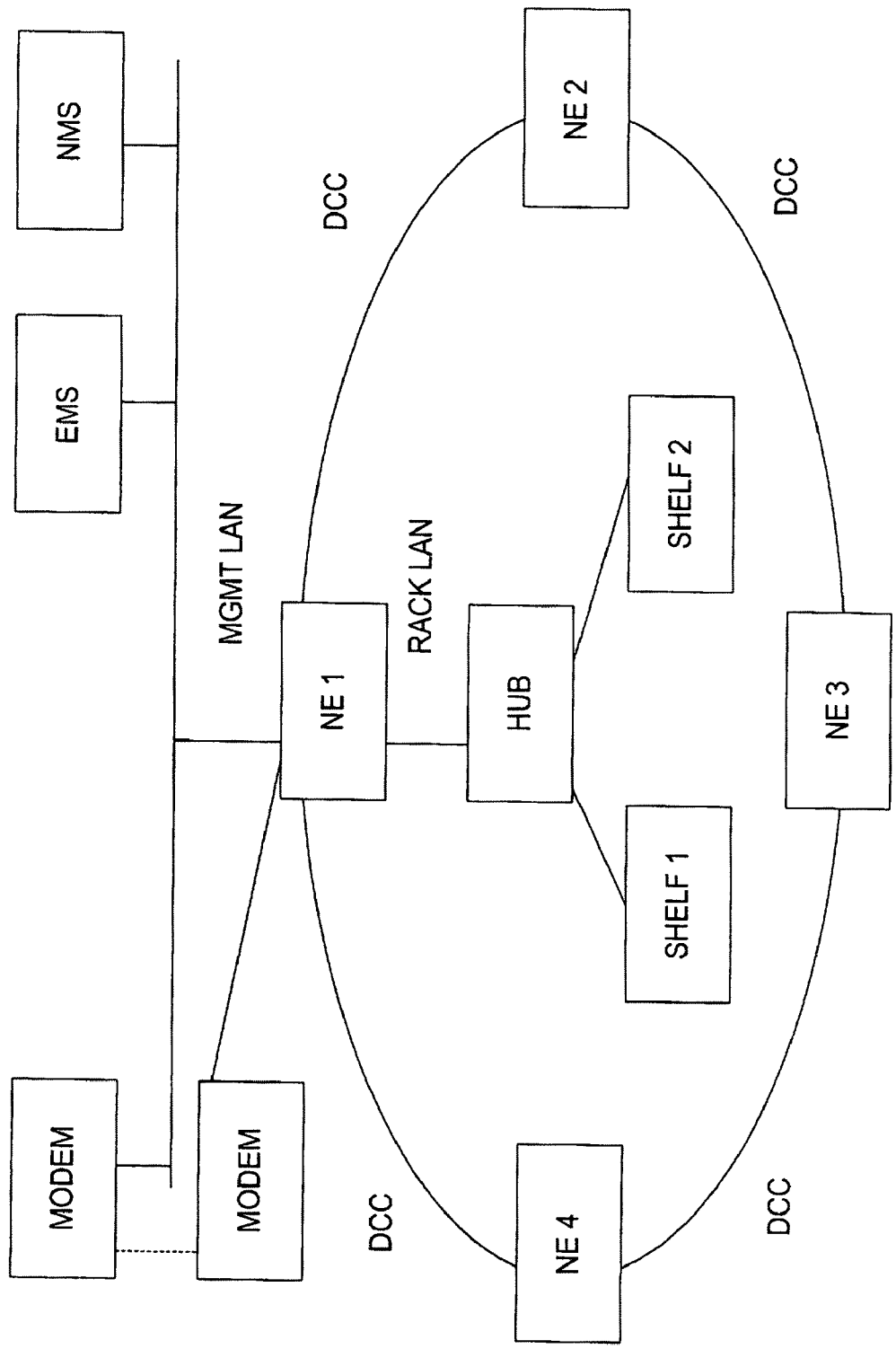
FIG. 7 illustrates the flexible cross-connect system within multiple networks, according to one embodiment.

FIG. 7 illustrates a sample view of the flexible cross-connect system 10 within multiple networks. In this figure, a flexible cross-connect system 10 (identified as NE1) is part of a network ring consisting of NE1-NE4. Thus, two, of the ten DCC connections are used to have NE1 be part of this network ring. The NE1 is also connected to a rack LAN via the packet shelf LAN interface port (SCC 554), a management LAN via the management LAN interface port (SCC 506), and a modem via the modem port (SCC 560). Each of the PPP connections will not have a unique IP address, instead the single IP address for each sub-network the NE1 is part of is the IP address for the NE1 to management LAN connection.

Figure 8:
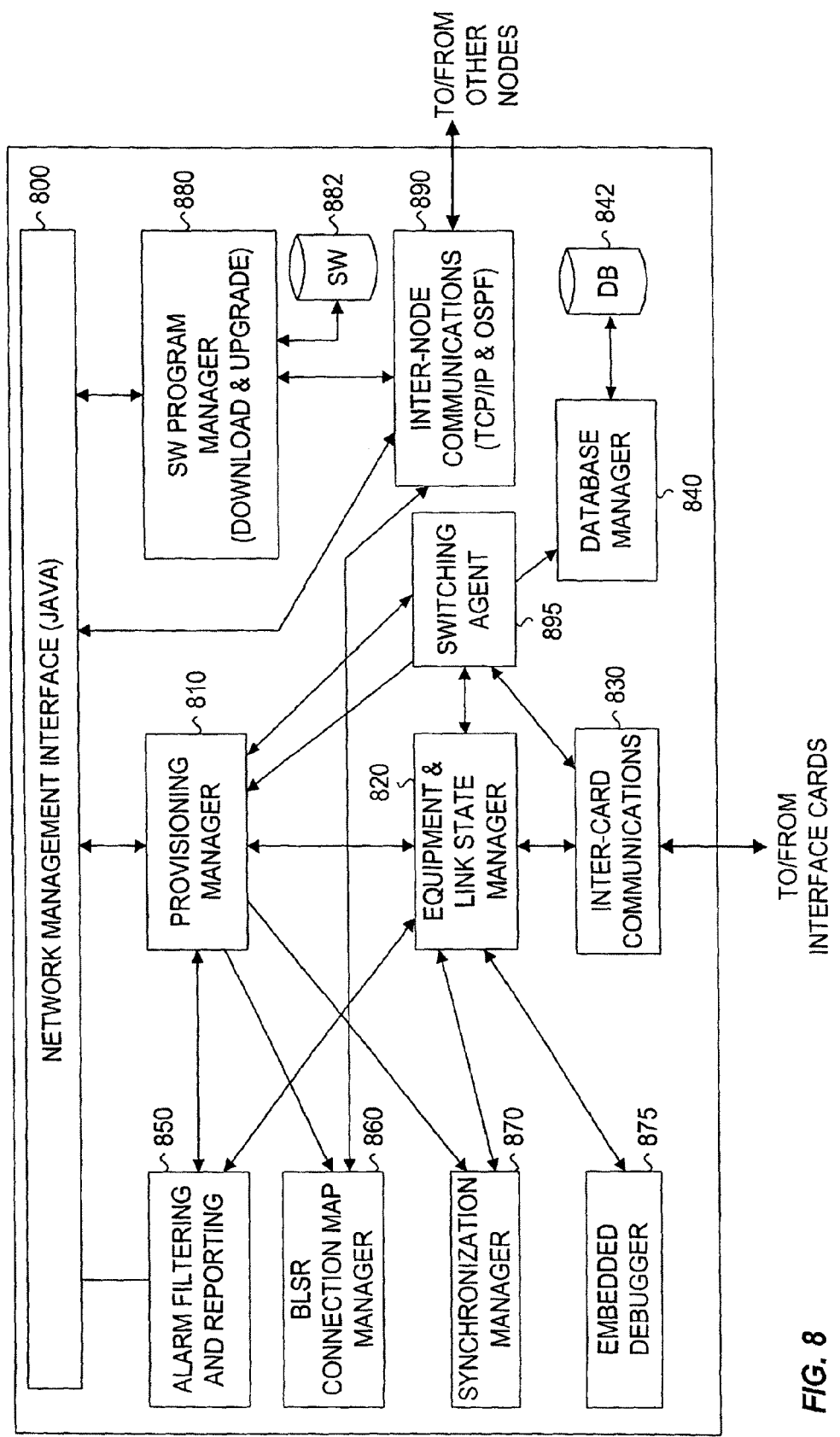
FIG. 8 illustrates the software architecture of the control system, according to one embodiment.

FIG. 8 illustrates the software architecture, according to one embodiment. The software may be written in an object oriented language such as JAVA, C or C++. In a preferred embodiment, the software is written using C and C++ programming languages, which are running together on one operating system, such as VxWorks® real time operating system sold by Wind River Systems Corporation. In a preferred embodiment, the low-level software which communicates between boards in the system (the CS 420) is written in C, while the interface software which communicates with the EMS 430 or the NMS 440 (the NMIS 410) is written in C++ and Java. In a preferred embodiment, the software runs on the CP 500 and the DCCP 550.

The software architecture includes a Network Management Interface module (NMI) 800, a Provisioning Manager module (PM) 810, an Equipment and Link State Manager module (ELSM) 820, and Inter-Card Communications module (ICC) 830, a Database Manager module (DM) 840, an Alarm Filtering and Reporting module (AFR) 850, a Bi-directional Line Switched Rings (BLSR) Connection Map Manager module (BCMM) 860, a Synchronization Manager module (SM) 870, an Embedded De-bugger module (ED) 875, a SW Program Manager module (SPM) 880, an Inter-Node Communications module (INC) 890, and a Switching Agent module (SA) 895.

The NMI 800 serves as the interface to the EMS 430 and the NMS 440. In a preferred embodiment, the NMI 800 is realized in the C++ programming language, and allows the use of any browser in a network element running a TCP/IP stack to address the system 10.

The PM 810 is responsible for managing a provisioning database for the entire flexible cross-connect system 10. The PM 810 interfaces with subordinate cards via the ELSM 820 and to the management software via the NMI 800. The PM 810 interfaces with a persistent database 842 via the DM 840. The PM 810 retrieves data, including equipment and service data, from the persistent database 842 after a TCC 300 restart and transmits the data to the MS and the subordinate cards. The PM 810 receives provisioning updates from the MS, stores the updates in RAM and the persistent database 842, and notifies the affected cards of the provisioning updates. When a subordinate card requests provisioning data, the PM 810 retrieves the relevant provisioning information from the database 842 and transmits it to the requesting card. In an embodiment that includes a redundant TCC 300, the PM 810 periodically updates the database 842 on the redundant TCC 300. The PM 810 provides an interface to the MS for backing up and restoring the database to an external system.

The ELSM 820 is the central point of communications between the TCC 300 and all other subordinate cards. The ELSM 820 monitors and maintains information about the state of each slot, card, and communications link in the system 10. It notifies other components of the TCC when a subordinate card needs service. It blocks information from being sent to a subordinate card if the subordinate card is in the wrong state. For example, the ELSM 820 would prevent a provisioning update message from being sent to a subordinate card that is in the process of updating its SW. The ELSM 820 communicates with the interface cards via the ICC 830. In a preferred embodiment, the ELSM 820 acts as the single authority on the state of each component in the system. The ELSM 820 on each non facility protected card is responsible for initiating an equipment protection switch when a partial or full failure is detected on a card. In a preferred embodiment, a card presence/alive message is transmitted over an SCL 352 from a non facility protected card to peer cards, subordinate cards, the TCC, and the XC 120. The ELSM 820 is responsible for monitoring this link and initiating the proper action when a failure is detected.

The ICC 830 is responsible for communicating with the subordinate cards. It receives signals from each of the subordinate cards and determines which of the other subordinate cards the signal is being transmitted to based on a routing byte within the cell. It maintains a priority queue, and preferably a high priority queue and a low priority queue, for each subordinate card. It detects and discards corrupt signals received from the subordinate cards.

The AFR 850 performs alarm filtering for the TCC 300 and the system 10. That is, when the arrival or removal of a failure condition is detected, the AFR 850 confirms that the condition has persisted for the requisite period of time, and filters out those that do not persist for the requisite time. The PM 810 is responsible for determining the appropriate filter times and providing them to the AFR 850. Once the arrival or removal of the failure condition clears the appropriate filter, the AFR 850 reports the change in alarm condition to the management system (EMS 430 or NMS 440). The interface cards and the XC 120 also perform failure filtering so that errors are not reported to the TCC 300 until the failure (or removal of the failure) has existed for a predetermined amount of time.

The BCMM 860 maintains information related to ring configurations for each node in the entire network. Each node needs to know its identification within the network ring so that it can determine when switch requests are directed to it and when they should be passed along to another node. When a ring configuration is modified, switched to or from a protection channel, at one node of the entire network, the BCMM 860 notifies all of the other nodes of the entire network. In a preferred embodiment, the BCMM utilizes the K1/K2 bytes of the SONET line overhead to transmit this data as well as TCP/IP messages over the DCC.

The SM 870 supports several timing-related services including configuring and monitoring an internal stratum 3 clock reference, provisioning and monitoring of a Building Integrated Timing Supply (BITS) input, provisioning and control of the DSX-1 formatted BITS output, and selection of the timing reference for the system. In addition, the SM 870 selects the timing reference for the BITS output, processes and acts upon synchronization status messages, and controls synchronization switching on synchronization reference changes.

The ED 875 provides the ability to analyze software behavior.

The SPM 880 manages software tracking, downloading and upgrading. That is, the SPM 880 keeps track of the SW versions that are utilized by each of the cards within the system 10, and ensures the SW versions are either upgraded or replaced by new versions when appropriate. For example, when the flexible cross-connect system 10 receives a software upgrade, the SPM 880 establishes communications with the NMI 800 so that a SW load can be received. The SPM 880 then validates the integrity of the SW load and stores the load in a non-volatile file system. The SPM 880 then ensures that the subordinate cards have access to the new software when they boot. Moreover, the SPM 880 can update the boot code and drivers for the system 10 and each subordinate card when necessary. The SPM 880 stores the SW, whether it be the original or a downloaded version, in a SW database 882.

The INC 890 supports communications between the system and other nodes, using both TCP/IP and OSPF protocols.

The SA 895 controls the switching of cards (interface, XC 120, 125, or TCC 300, 305) or connections (PPPs 150, SCLs 352, or communication bus 360) within the system 10 from redundant to active when there is a failure in the active one. Thus, the system can autonomously recover from failures.

The present system can be utilized in a variety of configurations supporting transport of data on MAN/LAN, inter-LATA and interexchange networks. Because the system can establish cross connections between any interface cards and can use a data plane for local switching, a wide variety of transport configurations can be supported, including configurations in which a virtual LAN is created in the data plane 110, and access to the telecom plane 100 is granted for transport to other nodes.

Although this invention has been illustrated by reference to specific embodiments, it will be apparent to those skilled in the art that various changes and modifications may be made, which clearly fall within the scope of the invention. The invention is intended to be protected broadly within the spirit and scope of the appended claims.

What is claimed is:

1. A method comprising:
monitoring by an active control unit and a redundant control unit the operational status for each one of a plurality of elements and each one of a plurality of communications links within a flexible cross-connect system, the plurality of elements including: the active control unit, the redundant control unit, a plurality of interface cards, an active cross-connect unit, a redundant cross-connect unit, and a plurality of point to point connections acting as the communications links between the plurality of elements;
determining when the operational status of any of the plurality of elements or the communications links between the plurality of elements indicates that the element or the communications link is non-operational;
autonomously switching from one active element to an associated redundant element in response to determining that the one active element is non-operational or from one active communications link between the plurality of elements to an associated redundant communications link between the plurality of elements in response to determining that the one active communications link is non-operational;
determining when the non-operational active element or the non-operational active communications link between the plurality of elements requires maintenance;
reporting that maintenance is required for the non-operational active element or the non-operational active communications link between the plurality of elements in response to determining that the non-operational active element or the non-operational active communications link between the plurality of elements requires maintenance; and
blocking communications from being sent to the non-operational active element or over the non-operational active communications link.

2. The method of claim 1, and further comprising flagging an element with a non-operational status if the element is receiving a software upgrade.

3. The method of claim 1, further comprising:
recording data related to each element in a database; and
updating the database to reflect changes to any of the elements, wherein the changes include maintenance performed on, replacement of, or user configuration changes.

4. The method of claim 1, further comprising:
detecting and reporting when any element or communications link between the plurality of elements has a change in operational status.

5. The method of claim 4, wherein said detecting and reporting includes:
tracking how long the change in operational status persists;
determining when the change in operational status has persisted for at least a predetermined amount of time; and
reporting the change in operational status when the predetermined amount of time is exceeded.

6. The method of claim 5, wherein said detecting and reporting further includes discarding the change in operational status when the change in operational status does not persist for the predetermined amount of time.

7. The method of claim 1, wherein the flexible cross-connect system is a first node within a network, and further comprising maintaining a connection map for the network.

8. The method of claim 1, further comprising:
maintaining a connection map associated with the flexible cross-connect system, the flexible cross-connect system being a node in a network, the connection map being arranged to indicate states of nodes within the network; and
updating the connection map to indicate a change in status of the flexible cross-connect system when it is determined that the operational status of any one of the plurality of elements or any one of the communications links between the plurality of cards indicates that the element is non-operational or the communications link between the plurality of elements is non-operational.

9. The method of claim 1, wherein autonomously switching from the non-operational active element to the associated redundant element includes switching from the active control unit to the redundant control unit.

10. The method of claim 1, wherein at a first interface card configured to be coupled to a wide area telecommunications network and a second interface card configured to be coupled to a separate data network, further comprising connecting the wide area telecommunications network with the data network via the flexible cross-connect system.

11. A computer readable non-transitory medium storing a computer program that, when executed by a processor, cause the processor to:
monitor the operational status for each one of a plurality of elements and each one of a plurality of communications links within a flexible cross-connect system, the plurality of elements including: an active control unit, a redundant control unit, a plurality of interface cards, an active cross-connect unit, a redundant cross-connect unit, and a plurality of point to point connections acting as the communications links between the plurality of elements;
determine when the operational status of any of the plurality of elements or the communications links between the plurality of elements indicates that the element or the communications link is non-operational;
autonomously switch from one active element to an associated redundant element in response to determining that the one active element is non-operational or from one active communications link between the plurality of elements to an associated redundant communications link in response to determining that the one active communications link is non-operational;
determine when the non-operational active element or the non-operational active communications link between the plurality of elements requires maintenance;
report that maintenance is required for the non-operational active element or the non-operational active communications link between the plurality of elements in response to determining that the non-operational active element or the non-operational active communications link between the plurality of elements requires maintenance; and
block communications from being sent to the non-operational active element or over the non-operational active communications link.

12. The computer readable non-transitory medium of claim 11, wherein the computer program is configured to cause the processor to flag an element with a non-operational status if the element is receiving a software upgrade.

13. The computer readable non-transitory medium of claim 11, wherein the computer program is configured to cause the processor to:
    record data related to each element in a database; and
    update the database to reflect changes to any of the elements, wherein the changes include maintenance performed on, replacement of, or user configuration changes.

14. The computer readable non-transitory medium of claim 11, wherein the computer program is configured to cause the processor to:
    detect and report when any element or communications link has a change in operational status.

15. The computer readable non-transitory medium of claim 14, wherein the computer program is configured to cause the processor to:
    track how long the change in operational status persists;
    determine when the change in operational status has persisted for at least a predetermined amount of time; and
    report the change in operational status when the predetermined amount of time is exceeded.

16. The computer readable non-transitory medium of claim 15, wherein the computer program is configured to cause the processor to discard the change in operational status when the change in operational status does not persist for the predetermined amount of time.

17. The computer readable non-transitory medium of claim 11, wherein the computer program is configured to maintain a connection map for a network, wherein the flexible cross-connect unit is a first node within the network.

18. The method of claim 11, wherein autonomously switching from the non-operational active element to the associated redundant element includes switching from the active cross-connect unit to the redundant cross-connect unit.

19. An apparatus, comprising:
a plurality of cross-connect units comprising at least an active cross-connect unit and a redundant cross-connect unit;
a control unit configured to:
monitor the operational status for each one of the plurality of cross-connect units and a plurality of point to point connections acting as communications links between a plurality of elements within a flexible cross-connect system, the plurality of elements including: the control unit, a redundant control unit, a plurality of interface cards, the active cross-connect unit, the redundant cross-connect unit, and the plurality of point to point connections acting as the communications links between the plurality of elements;
determine when the operational status of any of the plurality of elements or the communications links between the plurality of elements indicates that the element or the communications link between the plurality of elements is non-operational;
switch from one active element to an associated redundant element in response to determining that the one active element is non-operational or from one active communications link between the plurality of elements to an associated redundant communications link between the plurality of elements in response to determining that the one active communications link is non-operational; and
determine when the non-operational active element or the non-operational active communications link between the plurality of elements requires maintenance;
report that maintenance is required for the non-operational active element or the non-operational active communications link;
block communications from being sent to the non-operational active element or over the non-operational active communications link.

* * * * *